United States Patent [19]

Guarracini et al.

[11] 4,320,487

[45] Mar. 16, 1982

[54] VIDEO DISC STYLUS CONTROL APPARATUS

[75] Inventors: Joseph Guarracini, Lawrenceville; Vincent J. Ruggeri, Fairview, both of N.J.

[73] Assignee: RCA Corporation, New York, N.Y.

[21] Appl. No.: 189,818

[22] Filed: Sep. 23, 1980

[51] Int. Cl.³ .............................................. G11B 17/00
[52] U.S. Cl. ...................................... 369/43; 369/215
[58] Field of Search ................. 369/43, 126, 215, 244, 369/219, 254, 146, 147; 358/128.5, 128.6; 310/12, 13

[56] References Cited

U.S. PATENT DOCUMENTS

| | | | |
|---|---|---|---|
| 3,763,335 | 10/1973 | Morita | 369/146 |
| 4,152,727 | 5/1979 | Fatsuguchi | 369/43 |
| 4,160,268 | 7/1979 | Gota | 369/43 |
| 4,170,783 | 10/1979 | Fajima | 369/43 |
| 4,183,059 | 1/1980 | Palmer | 369/43 |

FOREIGN PATENT DOCUMENTS 55-157137 12/1980 Japan .

Primary Examiner—James W. Moffitt
Assistant Examiner—Alan Faber
Attorney, Agent, or Firm—E. M. Whitacre; J. S. Tripoli; E. P. Herrmann

[57] ABSTRACT

A video disc player having a signal pickup stylus for engaging a disc record is equipped with a steering device to provide three degrees of motion to the stylus. The stylus is secured to a stylus arm, the second end of which is compliantly mounted to a support structure. A permanent magnet in the shape of a cruciform with a like magnetic pole at each extremity is secured to the second end of the stylus. Magnetic field producing electric coils are arranged proximate each of the extremities of the cruciform and secured to the support structure so that energization of the coils will apply force to the cruciform causing the stylus arm to pivot about its compliant mounting.

6 Claims, 7 Drawing Figures

VIDEO DISC STYLUS CONTROL APPARATUS

This invention relates to a video disc player and, in particular, to apparatus for adjusting the pressure between a signal pickup stylus and the disc record and for moving the stylus radially across and tangentially along an information track on the surface of the disc record.

The video disc is a high density recording medium in which signal is recorded as geometric patterns in circular or spiral information tracks proximate the surface of the disc record. In order to incorporate acceptably sufficient information on a single disc, the geometric patterns and the track pitch must be extremely small, e.g., 4000 to 10,000 convolutions per inch. As a result, track signal recovery systems which engage and track the information tracks require relatively precise position control apparatus to produce and maintain reliable tracking. Track following signal pickup styli which engage the disc are concomittantly small and subject to wear. In order to minimize such wear, it is desirable to adaptively control the stylus-disc pressure. A further consequence of the high track density is that relatively small track eccentricity with respect to the axis of rotation of the disc will produce sufficient velocity changes between the stylus and the disc to distort the recovered signal and the velocity variations must be compensated either mechanically or electrically.

Certain capacitive video disc systems (wherein a time varying capacitance is produced between the stylus and the disc in accordance with the geometric variations in the information track when constant relative velocity is maintained between the stylus and the track) employ high frequency rf signals, e.g., 915 MHz, near the stylus to detect the capacitance variations. To preclude radiation of the rf signal, the signal recovery apparatus proximate the stylus is encompassed in an rf shield. In light of the rf signal considerations, it is desirable to position the mechanical apparatus to achieve the aforementioned stylus control as far distant from the stylus as possible.

Accordingly, it is a general object of the present invention to provide an apparatus for controlling the position of a signal recovery stylus which overcomes the above-described problems. In accordance with the invention, a signal pickup stylus is secured to the first end of a longitudinal stylus arm, the stylus arm being compliantly mounted to a support structure to permit limited pivotal movement of the stylus thereabout and movement in the axial direction of the stylus arm. A permanent magnet in the shape of a cruciform is secured generally normal to the stylus arm at a position proximate the second end of the stylus arm, the cruciform having a magnetic pole at each of its extremities. Respective magnetic field producing coils are secured to the support structure proximate each of the magnetic poles of the cruciform so that the axis of each coil is generally normal to the plane of the cruciform. Selective energization of appropriate combinations of the coils to create magnetic fields therein applies force to respective poles of the cruciform causing pivotal motion, longitudinal motion, or a combination of both to the stylus arm and thereby to the signal pickup stylus.

Other objects and features of the invention will be apparent from the following detailed description and the accompanying drawings.

Figure 2:
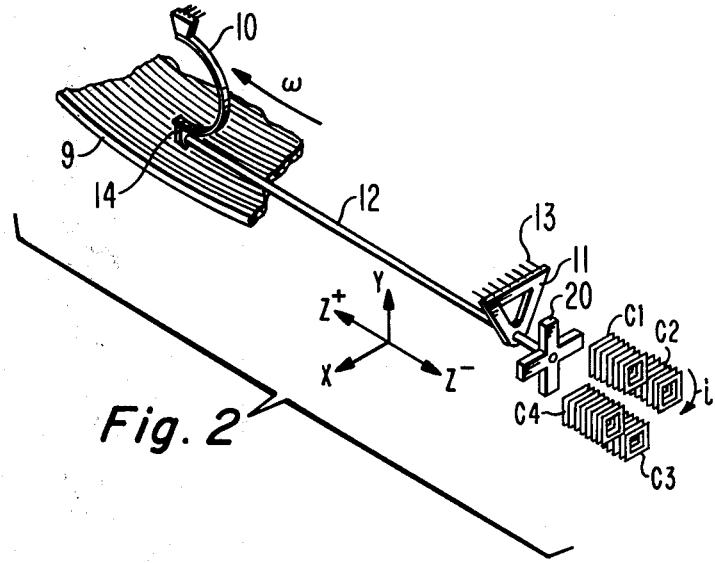
FIGS. 2 and 4 are perspective schematic diagrams of video disc signal recovery apparatus embodying the present invention.
Figure 3:
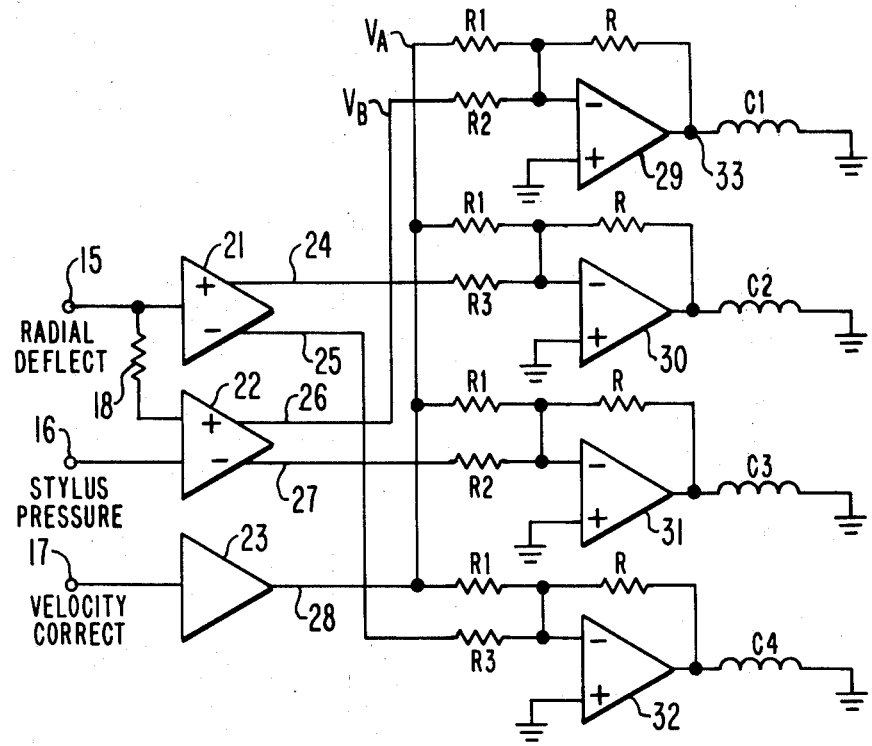
Figure 4:
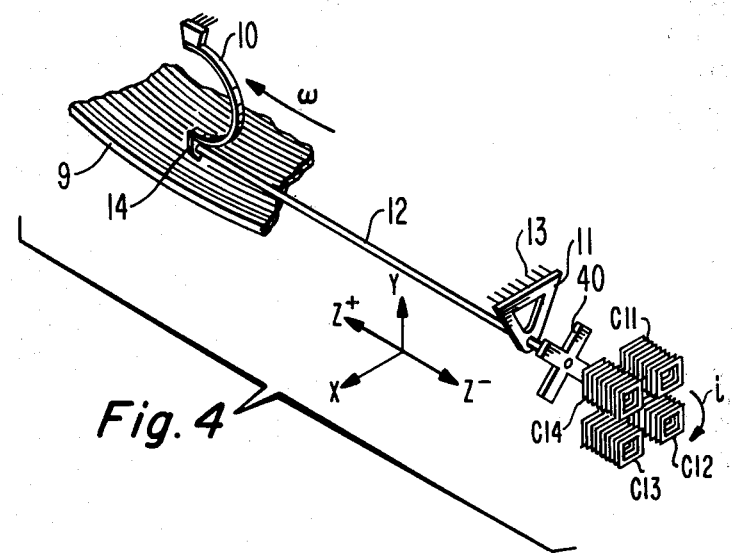
Figure 5:
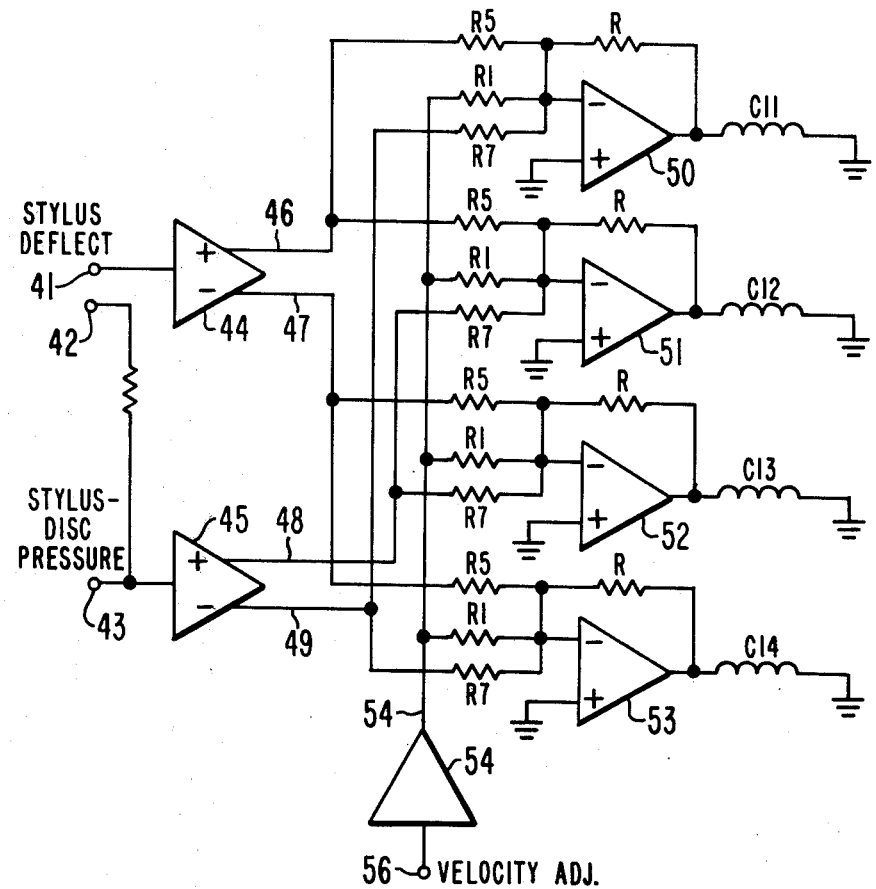
Figure 6:
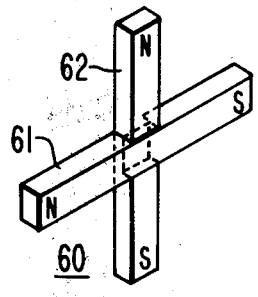
Figure 7:
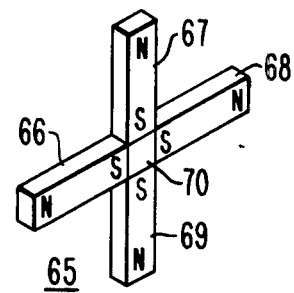

FIGS. 3 and 5 are respective schematic diagrams of circuitry for energizing the coils of the FIGS. 2 and 4 apparatus respectively; and FIGS. 6 and 7 are two arrangements of a cruciform magnetic structure.

Figure 1:
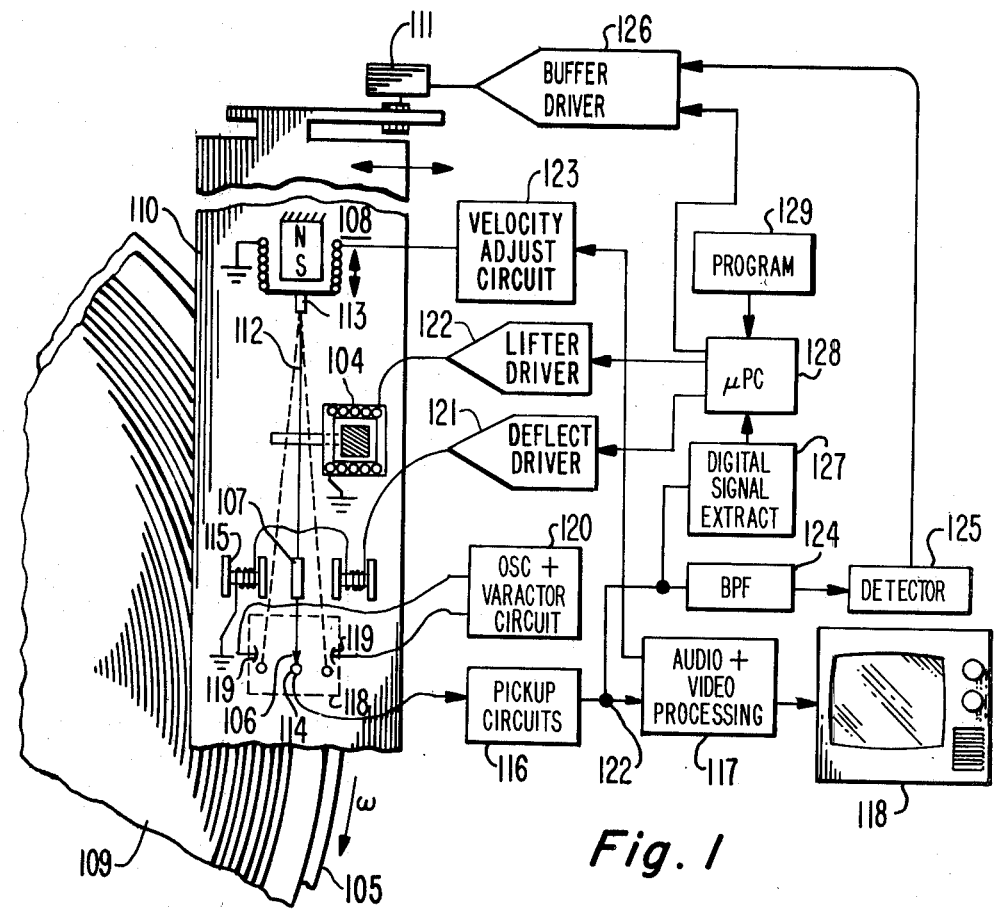
FIG. 1 is a partial block diagram, partial schematic diagram of a portion of a prior art video disc player.

In the prior art arrangement of FIG. 1, a disc record 109 is rotatably supported at a constant angular velocity $\omega$ by the turntable base 105. A carriage assembly 110, driven by the carriage drive motor 111, supports a signal recovery stylus 114 and radially translates it across the record. The pickup stylus 114 is secured to a first end of the stylus arm 112, the second end of which is connected to transducer 108 by the compliant coupler 113. Coupler 113 permits lateral pivotal movement of the stylus arm as shown by the broken lines as well as movement in the direction into and out of the drawing.

Transducer 108, which is similar to a solenoid or speaker coil assembly, is secured to the carriage and imparts longitudinal motion to the stylus arm to compensate for relative stylus-disc velocity changes. Transducer 108 is energized by circuitry 123 which detects the velocity change through deviations in components of the signal recovered from the disc record. See, for example, U.S. Pat. No. 3,965,482 entitled "Velocity Correction Circuit for Video Disc", issued to T. W. Burrus.

A stylus deflector transducer comprising coils 115 secured to the carriage and permanent magnet 107 secured to the stylus arm, selectively translates the stylus radially across the information tracks to produce special effects such as fast or slow motion or to correct for anomalous stylus tracking. The magnet 107 is influenced to move rightward or leftward by appropriate magnetic fields generated between coils 115 when they are energized by driver 121. The coils 115 are energized by driver 121 responsive to microprocessor control. In effecting stylus deflection, the microprocessor 128 is responsive to user control via program element 129 and/or the recovered signal. The recorded signal includes information to identify the track currently being played. This information is extracted from the recovered signal in circuitry 127. In normal operation the microprocessor monitors the track identification information to determine whether the stylus is tracking in a normal or desired progression. When the identification information deviates from the expected progression, the microprocessor energizes the coils to correct the stylus position.

Microprocessor 128 also controls a lifter driver 122 to selectively energize transducer 104 for raising and disengaging the stylus from the disc record.

First and second position sensitive capacitors comprising respective plates 119 mounted to the carriage and plate 106 secured to the stylus arm inject a pilot signal from circuit 120 into the signal recovered from the disc. The phase and amplitude of the pilot signal occurring in the recovered signal is extracted via bandpass filter 124 and detector 125. The detected signal is indicative of the relative stylus-carriage position and is used to energize the carriage drive motor 111 through driver buffer 126 to maintain the stylus arm in a nominally centered position.

Circuitry 116 cooperates with the stylus 114 to recover the recorded information from the disc. The output signal from circuit 116 is applied to a signal processing circuit 117 which conditions the recovered signal for application to the antenna terminals of a conventional TV receiver 118. Circuitry 116 generates the aforementioned rf signal, and a detailed description of one such circuit may be found in U.S. Pat. No. 4,080,625 entitled "Pickup Circuitry for a Video Disc Player, with Printed Circuit Board", issued to H. Kawamoto et al.

A first embodiment of the invention will be described with reference to FIGS. 2 and 3. In FIG. 2 a signal pickup stylus 14 is secured to a first end of the stylus arm 12 and arranged to engage disc record 9. The pickup stylus is electrically connected to circuitry within a carriage support structure (not shown) via conductive filament 10. A Vee shaped element 11 compliantly secures the stylus arm to the carriage structure 13. Element 11 supports the stylus arm near its second end in a generally cantilevered manner. The compliance of the element is sufficient to permit pivoting of the stylus arm thereabout and to permit movement of the stylus arm along its longitudinal axis. Essentially, the support element permits at least limited, relatively free movement of the stylus in the directions designated X, Y, and Z. Element 11, however, is sufficiently elastic to apply a restorative force to the stylus arm to at least partially return it to an unbiased or relaxed position.

A permanent magnet 20 in the shape of a cross with a pole at the end of each of its arms is secured to the second end of the stylus arm. The plane of the cross is generally normal to the longitudinal axis of the stylus arm. Four coils C1, C2, C3, and C4 secured to the carriage structure are respectively arranged proximate respective ones of the poles, the axis of the respective coils being generally normal to the plane of the cross. For purposes of discussion, it will be assumed that the poles of the permanent magnet are of the same polarity (north) and have equal field strength, that the coils are equidistant from the cruciform magnet, are polarized in the same direction for like directed energization current according to the right hand rule and generate like magnetic field strength for like energization current.

Since the coils are fixed relative to the compliantly mounted stylus arm and therefore the compliantly mounted permanent magnet, a magnetic field generated by one of the coils will interact with the field lines emanating from the permanent magnet, producing a force therebetween tending to move the permanent magnet. Consider energizing the coils C1, C2, C3 and C4 identically with current in the direction indicated by the arrow "i". Then each coil will develop a north pole at its end nearer the permanent cruciform magnet 20 tending to repel the magnet 20 along the Z+ direction. Reversing the direction of current in the coils will cause the magnet 20 to be attracted thereto moving the magnet 20 and the stylus in the Z− direction. Thus, the coil-magnet arrangement can be used as a velocity adjusting transducer or armstretcher. Longitudinal motion may be imparted to the stylus arm by the simultaneous energization of the four coils or by either the C1, C3 or C2, C4 pairs of coils.

The stylus may be deflected in the X direction by applying complementary currents respectively to the C2 and C4 coils. Complementary currents in coils C2 and C4 will cause the coils to generate complementary magnetic fields at their ends adjacent magnet 20. Thus, one coil will attract the arm of magnet 20 adjacent thereto, and the other coil will repel its respective magnet arm causing magnet 20 to twist about an imaginary Y-directed axis and the stylus arm to pivot in its mounting 11 translating the stylus 14 along the X direction. As long as the attractive and repulsive forces generated by the respective coils C2 and C4 are equal, no longitudinal displacement will be imparted to magnet 20 and X-directed stylus deflection may be performed without affecting the relative stylus-disc velocity. Both velocity correction and X-directed deflection can be accomplished by superimposing the velocity correction coil energization current onto the stylus deflection coil current.

Stylus-disc pressure is controlled by application of the appropriate complementary energization currents to coils C1 and C3 to impart a twisting of the magnet 20 about an imaginary "X" axis. If coil C1 is energized to have a south pole adjacent magnet 20 and coil C3 is energized to have a north pole of equal force adjacent magnet 20, stylus 14 will tend to be lifted upward in accordance with the force applied. Again providing the forces developed by coils C1 and C3 are equal and opposite, substantially no Z-directed motion will be imparted to the stylus arm. However, the velocity correction energization current may be superimposed on the stylus lifting energization currents in coils C1 and C3 to effect velocity correction and stylus-disc pressure control simultaneously.

To achieve controllable twisting of the permanent magnet without substantial skewing, the stylus arm assembly is supported near the magnet. A consequence is that the ratio of the length of the stylus arm between magnet 20 and support 11 to the length between the stylus 14 and support 11 is relatively small. As the ratio decreases, the force required to deflect the stylus correspondingly increases and a trade off is required between the energization power provided and the level of acceptable skewing of the stylus arm assembly. Note, however, that the field strength generated at the ends of the respective coils may be appreciably increased by inserting soft iron cores therein.

Circuitry for energizing the respective coils of FIG. 2 is illustrated in FIG. 3. The circuit arrangement provides superposition of the velocity correction energization signal on all four coils. In the circuit, amplifiers 29-32 are differential amplifiers with sufficient gain so that with their non-inverting input terminals grounded and feedback provided between output and inverting input terminals, the inverting input terminal appears to be a virtual ground. Consequently, as is well known, each one of the amplifiers 29-32 behaves as a summing circuit. For example, with respect to amplifier 29, the potential at its output terminal 33 may be shown essentially to be $$V33 = V_A R/R1 + V_B R/R2 \tag{1}$$

where V33 is the output potential; R, R1, R2 are the respective resistance values of resistors R, R1, and R2, and $V_A$, $V_B$ are the potentials applied to the connections 28 and 26 respectively.

Amplifiers 21 and 22 respectively provide complementary output signals at their respective (+, −) output terminals.

The velocity correction signal is applied to the circuit at terminal 17 and buffered in amplifier 23 for application to the respective resistors R1 of each of the amplifiers 29-32. Therefore, each of the amplifiers 29-32 has an output signal component equal to $V_A R/R1$. The radial deflection signal is applied at terminal 15 to amplifier 21. A first non-inverted output signal at connection 24 is applied to amplifier 30 via resistor R3. A second complementary or inverted signal of equal amplitude at connection 25 is applied to amplifier 32 via resistor R3. The resulting potentials across coils C2 and C4 are $$VC2 = VA17R/R1 + BV15R/R3 \qquad (2)$$

$$VC4 = AV17R/RR - BV15R/R3 \qquad (3)$$

where A and B are the gain factors of amplifiers 23 and 21 respectively and V17, V15 are the input signal potentials at terminals 17 and 15 respectively.

Similarly, the stylus-disc pressure signal (which may be derived from the amplitude of the recovered signal) applied at terminal 16 is translated to the coils C1 and C3 via connections 26 and 27 to the amplifier circuits 29 and 31.

Consider a video disc system wherein the information tracks on the disc record are groove convolutions and the signal pickup stylus engages and tracks the groove. It can readily be seen that the C2, C4 coil-magnet interaction must generate considerable X-directed forces to urge the stylus laterally out of one groove convolution for translation to another convolution. However, the forces required are substantially reduced by simultaneously raising and disengaging, the stylus from the disc when it is to be deflected. Amplifier 22 is offset a fixed amount to energize coils C1 and C3 to lift the stylus whenever a deflection signal is applied to terminal 15. The offset is controlled by application of a portion of the deflection signal to amplifier 22 bias circuit through the resistor 18.

FIG. 4 illustrates a second embodiment of the invention wherein the arms of the cruciform magnet 40 secured to the stylus arm 12 are rotated in the plane of the cruciform 45 degrees with respect to the arrangement of FIG. 2. Velocity correction is effected similar to the FIG. 2 embodiment with either all the coils being simultaneously energized or either the C11, C13 or the C12, C14 pairs of coils being simultaneously energized. To effect stylus deflection, or stylus-disc pressure changes, all four of the coils are simultaneously energized in contrast to the FIG. 2 arrangement where only two coils are simultaneously energized per respective function. Each of the coils when energized contributes a component of torque about an imaginary Y and an imaginary X axis. For stylus deflection these torques are constructively added by simultaneously energizing coil pair C11, C12 and coil pair C13, C14 with complementary values of the deflection energization current. All things being equal between the FIG. 2 and FIG. 4 arrangements, save for the orientations of magnet and coils, the FIG. 4 arrangement creates √2 times the deflection force of the FIG. 2 arrangement. Similarly, the stylus-disc pressure is controlled by energizing coil pairs C11, C14 and C12, C13 with complementary values of the stylus-disc pressure energization current.

The FIG. 4 magnet-coil arrangement requires that the velocity correction, stylus deflection and stylus-disc pressure energization signals (or their complements, be superposed for application to all the coils. FIG. 5 illustrates one circuit arrangement for the appropriate conditioning and superposition of the signals input to terminals 41, 43 and 56 for application of coils C11-C14. Terminal 42 is provided for application of an appropriate deflection control signal to bias the stylus-disc pressure circuitry to lift the stylus from a grooved record when stylus deflection is to be performed. The FIG. 5 circuit is similar to the FIG. 3 circuitry except that the deflection and pressure signals are applied to all four summing amplifier arrangements 50-53. Aside from that difference, the FIG. 3 and FIG. 5 circuits are essentially the same.

FIGS. 6 and 7 illustrate two methods of realizing a cruciform permanent magnet. FIG. 6 is a simple crossed assembly of two bar magnets resulting in successive extremities being poled N-N-S-S. The particular pole sequence of the cruciform magnet will dictate the orientation of the corresponding coil or the polarity of coil energization signal to achieve the desired results. For example, the coils arranged proximate the south poles must be conditioned to create south pole fields thereat when the coils adjacent the north poles generate north poles respectively thereat to induce velocity correction. The FIG. 6 configuration is less desirable than a cruciform having like poles at each extremity as in FIG. 7 due to the inherent assymetry in the magnetic fields emanating from the poles. A like pole cruciform magnet is realized by cementing four discrete bar magnets in 90 degree increments about a rectangular, e.g., soft iron center section.

What is claimed is:
1. A video disc player of the type having a base for rotatably supporting a disc record and a signal recovery stylus secured to the first end of a stylus arm, the stylus arm being compliantly mounted in a carriage for supporting and translating the signal recovery stylus in a direction radially across the disc record and including transducer means cooperating with said stylus arm for manipulating the signal recovery stylus, said transducer means comprising:

a permanent magnet arranged in a cruciform and having a singular magnetic pole at each of its four extremities, said cruciform being secured to the stylus arm so that the plane of the cruciform is substantially normal to the longitudinal axis of the stylus arm;

four electric coils fixedly secured to said carriage, one coil being arranged proximate each of the cruciform extremities, so that the axes of the respective coils are generally normal to the plane of the cruciform, each coil having respective input terminals for applying energization currents thereto; and circuit means having respective input terminals for applying radial, tangential and normal control signals, and having four output terminals respectively connected to each of said four electric coils, said circuit means generating first energization signals applied to the coils laterally disposed on either side of the center of the cruciform responsive to said radial control for producing movement of the stylus only in the direction radially across the disc, generating second energization signals applied to the coils vertically disposed above and below the center of the cruciform responsive to said normal control signals for producing stylus movement only in the direction normal to the disc, and generating third energization signals to at least one pair of coils oppositely disposed about the center of the cruciform responsive to said tangential control signal for producing stylus movement only in the direction tangential to a generally circular track on the disc and wherein simultaneous application of the tangential, normal and radial control signals result in superposition of the respective first, second and third energization signals applied to the respective coils.

2. The video disc player set forth in claim 1 wherein the magnetic cruciform has one arm arranged parallel to the plane of said base.

3. The video disc player set forth in claim 1 wherein the arms of the magnetic cruciform are positioned at angles of 45 degress to said base.

4. The video disc player set forth in claims 1, 2, or 3 wherein the poles of all the extremities of the magnetic cruciform are of like polarity.

5. The video disc player set forth in claims 1, 2, or 3 wherein the electric coils have respective soft iron cores for enhancing their respective magnetic field concentration.

6. A signal pickup device for use in an apparatus for reproducing an information signal recorded in a track on a surface of a disc record, said pickup device comprising:

a signal pickup stylus for engaging and tracing the track on the disc record and for recovering an information signal recorded thereon when relative motion is created therebetween;

a generally longitudinal cantilever arm compliantly supported at a proximal end for limited pivotal and axial movement, said arm having said pickup stylus mounted at a free distal end thereof;

a cross shaped permanent magnetic structure having a singular magnetic pole at each of its four extremities, fixed to the cantilever arm nearer its proximal end so that the plane of the cross is substantially normal to the longitudinal axis of said cantilever arm;

four electric coils secured to a support structure, one coil being arranged proximate each of the four extremities of the magnetic structure and arranged so that the respective axis of the respective coil windings is generally normal to the plane of said cross shaped structure; and means for energizing said four coils to impart motion along the longitudinal axis of the cantilever and thereby affect the relative stylus-disc velocity, to impart pivotal motion to the cantilever normal to the disc and thereby adjust stylus-disc tracking pressure, and to impart pivotal motion to the cantilever generally parallel to the disc for steering the stylus radially across the disc, wherein the energization for the respective three dimensions of stylus motion may be simultaneously superposed on particular combinations of said four coils.

* * * * *

UNITED STATES PATENT AND TRADEMARK OFFICE
CERTIFICATE OF CORRECTION

PATENT NO. : 4,320,487

DATED : March 16, 1982

INVENTOR(S) : Joseph Guarracini and Vincent John Ruggeri

It is certified that error appears in the above—identified patent and that said Letters Patent is hereby corrected as shown below:

Col. 5, line 8; equation (2) should be

--VC2 = AV17R/R1 + BV15R/R3--

Col. 5, line 10; equation (3) should be

--VC4 = AV17R/R1 - BV15R/R3--

Col. 5, line 61; close parenthesis around the word "complements".

Signed and Sealed this

Twentieth Day of July 1982

[SEAL]

Attest:

Attesting Officer

GERALD J. MOSSINGHOFF

Commissioner of Patents and Trademarks